United States Patent [19]
Morimoto et al.

[11] 3,763,015
[45] Oct. 2, 1973

[54] PROCESS FOR THE SEPARATION OF STYRENE FROM THERMALLY CRACKED PETROLEUM BY POLYMER INHIBITION AND EXTRACTIVE DISTILLATION

[75] Inventors: Hiroshi Morimoto; Masanori Tatsumi, both of Kamakura, Japan

[73] Assignee: Toray Industries, Inc., Tokyo, Japan

[22] Filed: July 19, 1971

[21] Appl. No.: 163,586

[30] Foreign Application Priority Data
July 18, 1970   Japan.................................. 45/62702

[52] U.S. Cl.......................... 203/9, 203/29, 203/32, 203/34, 203/36, 203/43, 203/57, 203/58, 203/60, 260/669 A
[51] Int. Cl........................... C07c 15/10, B01d 3/40
[58] Field of Search ....................... 203/9, 8, 34, 32, 203/43, 36, 57, 58, 60; 260/669 A, 669 R

[56] References Cited
UNITED STATES PATENTS
3,684,665   8/1972   Abe et al............................. 203/32
2,900,421   8/1959   Kharasch................................ 203/9
2,741,583   4/1956   Vaughan................................. 203/8
2,613,175   10/1952  Johnstone et al....................... 203/9

*Primary Examiner*—Wilbur L. Bascomb, Jr.
*Attorney*—Paul & Paul

[57] ABSTRACT

A process is provided for the separation of styrene from thermally cracked petroleum. In the process of this invention thermally cracked petroleum is initially distilled to recover the fraction boiling between 120°C and 160°C. This fraction is then subjected to extractive distillation with an organic polar solvent containing a nitrite polymerization inhibitor in which the styrene is soluble. The solvent is removed and the styrene-containing fraction is thereafter treated with nitric acid after which it is scrubbed with water or alkali. The resulting product is fractionated to recover styrene of high purity which is substantially colorless.

10 Claims, 1 Drawing Figure

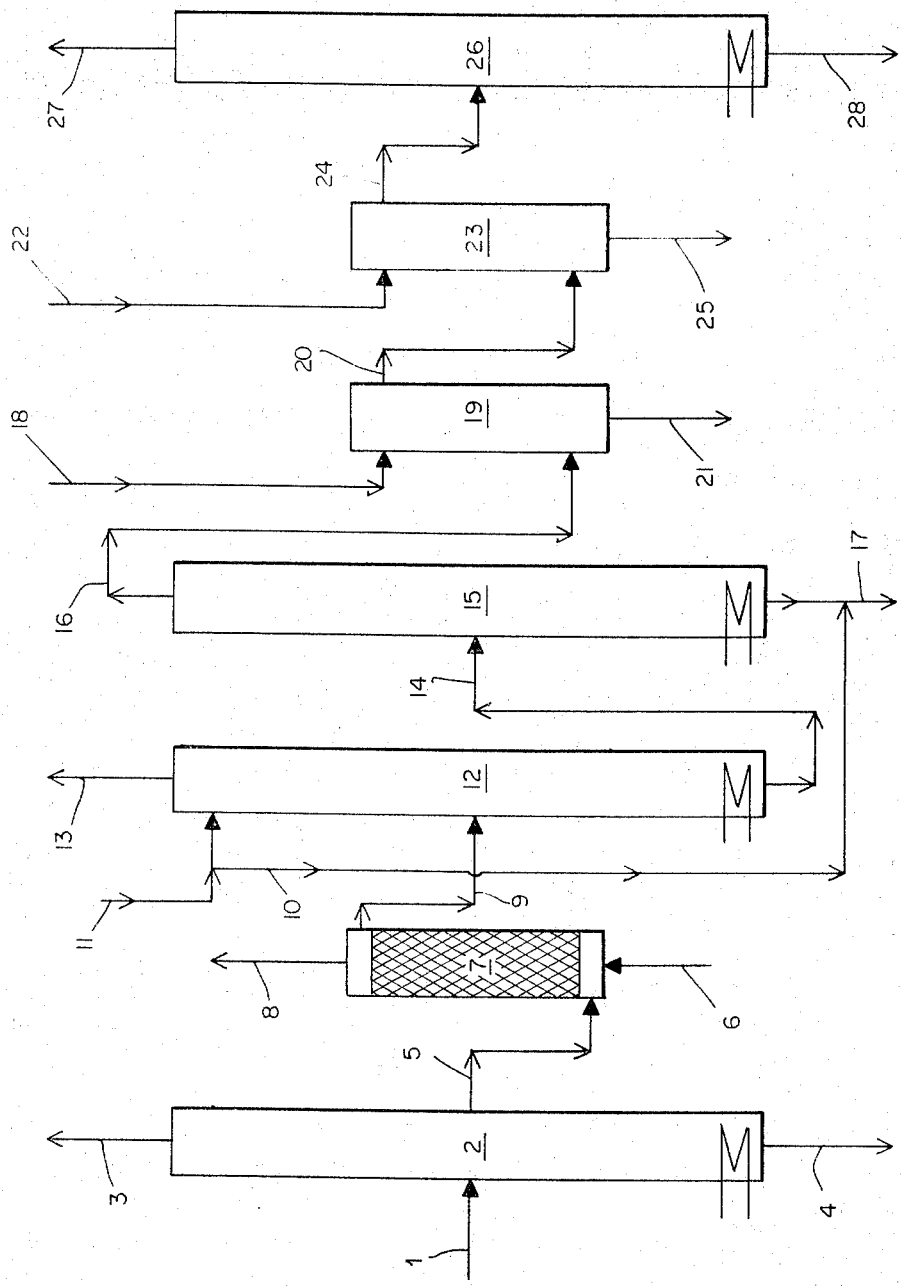

PROCESS FOR THE SEPARATION OF STYRENE FROM THERMALLY CRACKED PETROLEUM BY POLYMER INHIBITION AND EXTRACTIVE DISTILLATION

BACKGROUND OF THE INVENTION

1. Field of the Invention

This invention is concerned with a process for separating styrene from thermally cracked petroleum.

2. Description of the Prior Art

The term "thermally cracked petroleum" as used hereinafter refers to the by-product which is obtained as a result of thermal cracking of petroleum products such as naptha, kerosene, light oil, crude oil and the like at temperatures above 700°C to obtain olefinic gases such as ethylene, propylene and butene. Thermally cracked petroleum which is the by-product is composed of a mixture of compounds including various kinds of dienes, acetylenes, paraffins, olefins, naphthenes and aromatic compounds such as benzene, toluene, styrene, xylenes, naphthalenes and the like.

Large amounts of thermally cracked petroleum are produced commerically during the manufacture of olefinic gases. One of the more commercially valuable compounds in thermally cracked petroleum is styrene. However, in order to be saleable, the styrene must be separated from the other products in a substantially pure form and in an unpolymerized state.

Various processes have heretofore been suggested for separating styrene and xylene from thermally cracked petroleum. One of the more widely used processes consists of hydrogenating the unsaturated compounds such as the olefins, especially styrene, dienes and acetylenes to the corresponding saturated hydrocarbons. Thereafter the benzene, toluene and xylene fractions are separated by extraction. The ethyl benzene obtained by hydrogenation of styrene is recovered in the xylene fraction and separated therefrom by super precision fractional distillation. The ethyl benzene is then dehydrogenated to styrene and thereafter purified by distillation. This process is unsatisfactory in that it is too complicated; it comprises the steps of hydrogenating the styrene in the thermally cracked oil to ethyl benzene; separating the ethyl benzene and then reconverting the ethyl benzene by dehydrogenation to styrene. Another disadvantage is that this process consumes large amounts of hydrogen in the hydrogenation step and a large amount of steam and energy in the dehydrogenation step.

It is quite apparent that if the styrene in the thermally cracked petroleum could be directly separated from the thermally cracked petroleum, the aforesaid disadvantages would be overcome. Such attempts at direct separation were proposed in U.S. Pat. No. 3,328,267, and British Pat. No. 1,038,606. In U.S. Pat. No. 3,328,267 a process is suggested which consists of extractive distillation for the separation of styrene and o-xylene using a lower dialkyl formamide, preferably dimethyl formamide, as the extractive distillation solvent. This process has proven to be unsatisfactory when it is applied to thermally cracked petroleum. For example, when a styrene - xylene (o-xylene) fraction is extractively distilled while adding dimethyl formamide as the extraction solvent, the xylene (o-xylene) forms an azeotropic composition with the dimethyl formamide and is codistilled from the top of the column. On the other hand, the styrene in the solvent mixture obtained from the bottom of the column can be isolated by extracting the solvent with water and purifying the styrene by distillation. However, the styrene thus obtained is light yellow in color and the polystyrene obtained by thermal polymerization of the styrene has poor color and poor physical properties. It is also proposed in U.S. Pat. No. 3,328,267 to use p-tert-butylcatechol as a polymerization inhibitor. However, at temperatures above 100°C, and especially above 120°C, the undesirable production of styrene polymer (polystyrene) is quite substantial. Accordingly, in order to avoid the high temperatures inside the distillation column normally required because of the high boiling point of the solvent employed it is necessary to conduct the distillation under a highly reduced pressure. This makes the process highly disadvantageous from a commercial standpoint.

British Pat. No. 1,038,606 proposes a process for selectively extracting styrene from thermally cracked petroleum using an aqueous solution of a silver salt, for example, an aqueous solution of silver nitrate, and also discloses a process for preventing the formation of slime inside the extraction column by treating the thermally cracked petroleum with Fullers Earth before extraction.

It is accordingly an object of this invention to overcome the aforementioned problems and difficulties encountered with the prior art processes of extractive distillation.

It is an additional object of this invention to provide a simple and efficient process for recovering styrene from thermally cracked petroleum.

It is a more specific object to provide a commercially feasible process to recover styrene from thermally cracked petroleum having high purity and low color styrene which can be polymerized into polymers having excellent transparency.

Other objects and advantages of this invention will become further apparent hereinafter and from a continued reading of the specification and sub-joined claims.

SUMMARY OF THE INVENTION

The objects of this invention have been achieved by providing a process in which thermally cracked petroleum is initially fractionally distilled to recover the fractions boiling between 120° C and 160° C. The recovered fraction is then extractive distilled with an organic polar solvent containing a nitrite as a polymerization inhibitor in which styrene. The solvent is removed and the styrene containing fraction is treated with nitric acid, washed, and again distilled.

BRIEF DESCRIPTION OF THE DRAWING

The drawing is a schematic flow diagram of the process of the present invention.

DESCRIPTION OF THE PREFERRED EMBODIMENTS

The initial step in the process of the present invention is to fractionally distill thermally cracked petroleum and recover the fraction containing styrene, xylenes and others. The fraction which is recovered has a boiling point between 120°C and 160°C, and preferably 135°C and 150°C at atmospheric pressure. This fraction in addition to containing styrene and xylenes also contains paraffins, naphthenes, olefins, polyalkyl aromatic compounds, phenyl acetylenes and dienes having eight to nine carbon atoms.

The fractional distillation is conducted in the conventional manner. The fractional distillation may be conducted at sub-atmospheric pressure, atmospheric pressure or superatomospheric pressure. For practical reasons, it is preferable to conduct the distillation under atmospheric pressure or subatmospheric pressure.

The fractional distillation may be conducted by using a single distillation column. However, it is preferable to use two separate distillation columns with fractions having boiling points below 120°C and preferably below 135°C, being removed from the top of the first column and the fractions having boiling points above 160°C, and preferably above 150°C being removed from the bottom of the second column. It is, of course, possible to reverse the above procedure that is remove the higher boiling fractions from the bottom of the first column and the lower boiling fractions from the top of the second column. In any event, when two distillation columns are used, each should have 20 – 60 trays.

The fraction containing the styrene and xylenes obtained from the fractional distillation is then extractively distilled using an organic polar solvent effective for separation of styrene and xylenes. A styrene and solvent fraction, which contains a small amount of alkyl benzenes with nine carbon atoms and compounds having a high degree of unsaturation, is removed from the bottom of the distillation column. The xylenes, paraffins, napthalenes and olefins are distilled off from the top of the distillation column. As a solvent suitable for the extractive distillation, there may be cited, for example, diethylacetamide,$\beta$-methylpropionitrile, butyllactone, N-methylpyrrolidone, dimethylformamide and dimethylsulfoxide. The amount of the solvent used is 0.5 to 5 times by weight and preferably one to three times by weight of the styrene and xylenes fraction feed.

The extractive distillation can be conducted using either a single column or two or more columns. The total number of trays, counted as trays having effective gas-liquid contact action, should be between 50–150, and preferably between 70–110. The trays can be of the bubble cap type, sieve type or valve type. It is preferable to use the sieve type since there is less pressure loss.

The extractive distillation step is conducted under reduced pressure. The temperature of the reboiler of the column can be below 150°C and preferably below 140°C. The temperatures of distillation normally commercially employed for the separation of styrene and ethyl benzene is maintained below 110°C, and preferably below 100°C.

Since the permissible amount of pressure loss inside the column is substantial, a distillation column having a larger number of effective trays results in the purity of the product being improved, and the distillation can be conducted at a lower reflux ratio. The energy consumed is accordingly likewise decreased.

During extractive distillation the temperature inside the distillation column, especially in the vicinity of the reboiler, is quite high due to the high boiling point of the solvents used. For example, when the pressure at the top of the column is 50 mm Hg., the pressure in the vicinity of the bottom of a distillation column having 80 trays is 200–300 mm Hg. In this case, when the liquid composition at the bottom of the column is styrene the temperature is 100°C to 113°C. On the other hand, when dimethyl acetamide is used as a solvent for the extractive distillation the temperature at the bottom of the same distillation column is 115°C to 127°C.

Generally polymerization inhibitors are used during distillation of styrene. Typical inhibitors which are used are sulfur, hydroquinone and p-tert-butylcatechol. However, when the temperature is above 100°C and especially when it is above 120°C during extractive distillation these well known polymerization inhibitors are ineffective and a large amount of polystyrene is produced within a very short period of time.

It has been found that the addition of at least 50 ppm of sodium nitrite or potassium nitrite to the organic polar solvent used for extractive distillation effectively inhibits the polymerization reaction even when the distillation is carried out at a high temperature above 120°C for long periods of time. Because polymerization inhibitors gradually lose their activity during extractive distillation, it is preferable to initially add an amount of 100–5000 ppm and more preferably to initially add an amount of 200–1000 ppm of sodium nitrite or potassium nitrite.

It is also preferable to add together with the nitrite 101–2000 ppm and preferably 100–1000 ppm of a compound having at least one nitro, nitroso, quinoide, phenolic or hydroxy group in the molecule. The preferred additives are p-tert-butylcatechol, hydroquinone, p-benzoquinone, p-dinitrosobenzene, $\alpha$-nitro $\beta$-naphthol, o-nitrosonaphthol and $\alpha$-naphthoquinone.

The reflux ratio in the extractive distillation varies depending upon the composition of the concentrated fraction of the thermally cracked petroleum, the kind and amount (ratio to the oil supply) of the solvent, number of trays in the distillation column and the desired purity. In general, however, the reflux ratio should be between 5 – 30.

When the structure and operating conditions of the extractive distillation column are properly selected, a composition consisting of styrene and the solvent are taken off from the bottom of the column. Substantially none of the ethyl benzene, xylenes, naphthenes and paraffins whose boiling points are below 150°C are taken off with the effluent from the bottom of the extractive distillation column. The styrene is removed by distillation and/or washing with water from the solvent. Styrene having a high purity but light yellow color is obtained.

The styrene fraction obtained by the extraction distillation method noted above is further treated with nitric acid to convert the colored impurities to substances which can be removed easily by distillation and thereby obtain an even higher quality styrene. The concentration and amounts of nitric acid required for purification will vary depending upon the properties of the thermally cracked petroleum, the treating conditions and the treating method employed. The concentration of nitric acid should be within the range of about 40 – 100 percent and preferably about 50 – 70 percent by weight. The amount of nitric acid used to at least 1 percent based on the styrene fraction calculated as 100 percent nitric acid. There is no restriction on the upper limit, however, the nitric acid is generally limited to 100 percent by weight of the styrene fraction. It is preferable to use an amount of nitric acid between 1 – 30 percent based on the weight of the styrene fraction. It is, of course, possible to use amounts of nitric acid in excess of the amount required and recyclic the excess amount of acid after separation.

Various types of apparatus can be used to treat the styrene fraction with nitric acid provided the device will insure good mixing of the nitric acid with the styrene fraction. For example, a vessel with a stirrer, a column with a rotary disk and an in-line mixer are all suitable. Mixer/stirrers used to make fine dispersions are especially suitable. The contact time varies depending upon the type of device and amount of nitric acid used. However, 1–30 minutes is generally effective. The reaction temperature should be 0°–50° C, and preferably 20°–40° C. It is not necessary to carry out the nitric acid reaction under pressure.

The styrene fraction after treatment with nitric acid is separated from the nitric acid by phase separation. Removal of the impurities from the styrene fraction is completed by washing with water and distillation. The effect of washing with water can be further improved when it is combined with washing with an alkali solution and conducted under heated conditions.

By selective hydrogenating the thermally cracked petroleum during or after the initial distillation step using a palladium catalyst it is possible to further improve the process of the present invention. The palladium used as a catalyst is modified so that it is at best only very slightly active with regard to hydrogenation of styrene, but shows selective hydrogenation activity of compounds having a high degree of unsaturation, especially mono- and poly-ines, for example, phenylacetylene. To impart the selectivity to the hydrogenation reaction, a palladium catalyst is supported on a carrier and partially deactivated. It is preferable to use either powdered calcium carbonate or granular alumina as the carrier. Deactivation of the palladium catalyst is obtained by adding metals such as lead, copper, zinc, bismuth, mercury, tin or cadmium to the palladium catalyst. The concentration of the palladium on the carrier should be within the range of about 0.01 – 10 percent and preferably 0.1–5 percent. The catalyst may be prepared in the form of powder, pellets or any other suitable form. Suitable operating conditions are pressure: 1–20 kg/cm$^2$ temperature: 30°–100° C and LHSV: 5–50. The hydrogenation converts certain of the impurities that are difficult to remove when unsaturated to saturated compounds which are more easily removed in the subsequent extractive distillation and treatment with nitric acid. The hydrogenation is optional but is advantageously used since it improves the resulting quality of the styrene.

The process of the present invention is schematically illustrated in the drawing. The thermally cracked petroleum is supplied through line 1. The thermally cracked petroleum is a hydrocarbon oil which is obtained by treating naphtha, kerosene, light oil, crude oil, or the like at a temperature of about 700°C to 850° C and removing the resulting products having low boiling points such as the olefins like ethylene, propylene, butylenes and butadiene, paraffins like ethane, propane, butanes and pentanes as well as a high boiling point portion such as tar. In the thermally cracked petroleum 3–7 percent of the weight is styrene and 5 – 15 percent by weight is xylenes.

In the fractional distillation column 2, which as illustrated consists of one column, the low boiling fractions contained in the thermally cracked petroleum are removed via line 3. The higher boiling fractions contained in the thermally cracked petroleum are removed via line 4. The desired intermediate fraction consisting mainly of styrene and xylenes is removed via line 5.

A hydrogenation reactor 7 is provided which is packed with a pelletized palladium catalyst. Hydrogen is supplied to the reactor 7 via line 6. The hydrogenation reactor 7 is shown after the fractionating column in the flow sheet. It should be appreciated, however, that the hydrogenation reactor 7 can also be positioned before the fractionator 2, or when the fractionator 2 consists of two separate columns, it may be positioned between the first and second columns.

After hydrogenation which as noted above is optional, the styrene and xylene containing fraction is extractively distilled. The extraction solvent is supplied to the extractive distillation column 12 via line 10 with purified solvent and additional polymerization inhibitors being added through line 11. The solvent enters the column 12 at a position which is from the 0 – 30th tray from the top of the column. The styrene and xylene containing fraction is supplied via line 9 to a position which is about at the 20th – 60th tray from the top of the column.

A fraction consisting mainly of xylene which contains small amounts of solvent is removed from the top of the column. The solvent is separated from the xylene fraction After passing through appropriate purification treatments such as extraction or extractive distillation, purified xylene is recovered.

The polymerization inhibitors are supplied mainly via line 11. However, it is also effective to supply a part of the inhibitors through a reflux liquid line at the column top or to supply the inhibitors from a position below the middle portion of the column.

The solvent, styrene and higher boiling point materials are removed through line 14 and fed to a solvent separating column 15. The major part of the liquid at the bottom of column 15 is recirculated via line 10. A small part of the liquid is removed through line 17 and regenerated in a solvent purifying step.

The styrene fraction is removed via line 16 and fed into the nitric acid reactor 19. The styrene phase from the nitric acid reactor is transferred via line 20 and washed in the scrubber 23. Either alkali or water is supplied to a scrubber 23 through line 22. The styrene fraction separated by the scrubber 23 is fed into a final fractionating column 26 via line 24. High purity, high quality styrene is distilled off from line 27.

The following examples are given by way of further illustration of the process of the present invention and are not intended to limit the scope of the present invention beyond that of the subjoined claims. All parts and percentages are parts and percentages by weight, not volume, unless otherwise noted. The degree of coloration, APHA, shown in the examples and comparative examples is a unit of degree of coloration provided in JIS K 6727-1963.

EXAMPLE 1

A thermally cracked petroleum obtained from a factory where ethylene and propylene were prepared by thermal cracking of naphtha having the following composition was used as a starting material in each of the following examples and comparative examples.

| | |
|---|---|
| Benzene | 25% by weight |
| Toluene | 19% by weight |
| Ethyl benzene | 2% by weight |
| Xylenes | 9% by weight |

| | | |
|---|---|---|
| Styrene | 5% by weight | |
| Aromatic compounds having 9-10 carbon atoms | 19% by weight | |
| Substances whose boiling points are lower than the boiling point of benzene | 10% by weight | |
| Other non-aromatic compounds | 11% by weight | |

The thermally cracked petroleum was introduced the 30th tray from the top of a distillation column having 40 trays. The thermally cracked petroleum was distilled at a temperature of 88°C at the top of the column and a reflux ratio of 0.8. Xylene and substances having boiling points higher than xylene were removed from the bottom of the column and lower boiling fractions were removed from the top of the column.

The fraction removed from the bottom of the column was introduced into the 20th tray from the top of a second distillation column having a total of 40 trays. A fraction was distilled off at a temperature of 100°C, a pressure of 200 mm Hg at the top of the column and a reflux ratio of 2.

The fraction consisted mainly of xylene and styrene. The composition and properties of this fraction were as follows:

Composition of the concentrated fraction

| | |
|---|---|
| Toluene | 1.0% by weight |
| Ethyl benzene | 8.1% by weight |
| Paraxylene | 10.5% by weight |
| Metaxylene | 23.1% by weight |
| Orthoxylene | 12.4% by weight |
| Styrene | 28.4% by weight |
| Aromatic compounds having 9 carbon atoms | 0.2% by weight |
| Non-aromatic compounds | 16.3% by weight |
| Degree of coloration | APHA 400 |

To 1000 g of this concentrated fraction was added 1 g of a catalyst prepared by coating powdered calcium carbonate with 0.4 percent by weight of palladium and deactivating the palladium on the carrier with lead acetate. The mixture was stirred while hydrogen was blown through it at a rate of 100 cc/hr. for 5 hours. The hydrogen was introduced under atmospheric pressure. The temperature of a liquid phase was maintained at 40°C.

After this treatment, the powdered catalyst was removed and the resulting liquid phase was supplied to an extraction distillation column. The column had 100 trays. A solvent supply line was provided at the 5th tray from the top of the column. A feed line for the styrene containing fraction was provided at the 35th tray from the top of the column.

Dimethyl acetamide to which 200 ppm of sodium nitrite and 200 ppm of p-tert-butylcatechol were added as polymerization inhibitors was used as the solvent. The amount of the solvent used was 1.5 times the amount of said styrene containing fraction.

Distillation was carried out under a column top pressure of 100 mm Hg, at a column top temperature of 80°C and at a reflux ratio of 10. Although the temperature of reboiler reached 127°C the amount of polystyrene produced was very small. The polymerization loss of styrene measured by a methanol sedimentation method was below 0.1 percent based on the styrene in the material.

The solvent styrene solution removed from the bottom of the extractive distillation was fed to a distillation column having 40 trays. The styrene was distilled off the top of the column. The styrene had a purity of 99.7 percent. The color of this fraction was APHA 70 showing a light yellow color.

250 cc of this fraction and 12.5 cc of 60 percent nitric acid were charged in a stirring vessel and stirred at a high speed of stirring for 5 minutes. Thereafter the lower phase was removed by phase separation. After the upper phase (styrene phase) was washed with an alkaline solution it was distilled under a reduced pressure to distill off the styrene.

The styrene product had a purity of 99.8 percent, being completely colorless and transparent. The value of APHA was 5. The polymer (polystyrene) obtained by thermal polymerization of this styrene product was colorless and the various physical properties of the polymer were good.

COMPARATIVE EXAMPLE 1

Styrene was separated from the thermally cracked petroleum using the same procedures and apparatus as in example 1 except that in the extractive distillation column only 200 ppm of p-tert-butylcatechol was added.

When the styrene and the solvent mixture was removed from the bottom of the extractive distillation column, a considerable amount of polystyrene was in the product. The polymerization loss of styrene was found to be 4.5 percent. The production of the polymer exhibited an unfavorable influence such as contamination of the solvent and a loss of the styrene yield.

EXAMPLE 2

The process of Example 1 was repeated except that the polymerization inhibitor added to the solvent was limited to 200 ppm of sodium nitrite. When the polymerization loss of styrene was measured, it was found to be 0.5 percent.

COMPARATIVE EXAMPLE 2

A styrene fraction obtained by using the same material and procedures of, distillation, hydrogentation, reaction, extractive distillation, and separation of the solvent as in Example 1, was then washed with alkali water and the styrene was purified by the final fractionating column. The treatment with nitric acid, however, was omitted. The styrene product obtained had a purity of 99.7 percent, however, the degree of coloration was APHA 70 being considerably colored. The polystyrene obtained by thermal polymerization of the sytrene had an even greater degree of coloration being unsatisfactory for use as a transparent polymer.

EXAMPLE 3

The process of Example 1 was repeated except the polymerization inhibitor added to the solvent in the distillation column was replaced with 200 ppm of potassium nitrite and 200 ppm of p-benzoquinine. The amount of a polymer produced based on the styrene taken from the bottom of the extractive distillation column was below 0.1 percent.

EXAMPLE 4 – 7

Example 3 was repeated except the polymerization inhibitor was changed as follows. The loss of styrene in the extractive distillation was very small.

| Ex. | Inhibitor (A) (ppm) | Inhibitor (B) (ppm) | Polymerization loss of styrene (%) |
|---|---|---|---|
| 4 | Sodium nitrite | p-Dinitrobenzene | Below 0.1 |

| | (200) | (1000) | |
|---|---|---|---|
| 5 Sodium nitrite | (200) | α-Nitroso-β-naphthol (1000) | Below 0.3 |
| 6 Potassium nitrite | (200) | o-Nitrophenol (1000) | 0.3 |
| 7 Potassium nitrite | (200) | α-Naphthoquinone (1000) | Below 0.1 |

COMPARATIVE EXAMPLES 3–10

Example 1 was repeated except nitric acid was replaced as follows:

| Comparative Example | 3 | 4 | 5 |
|---|---|---|---|
| Treating agent | 98% Sulfuric acid 10cc | 60% Sulfuric acid 50cc | Concentrated phosphoric acid 10 cc |
| Quality of styrene | highly colored (remarkable polymerization | Colored | Colored |

| Comparative Example | 6 | 7 | 8 |
|---|---|---|---|
| Treating agent | Hypochlorous acid solution 50 cc | Aqueous solution of hydrogen peroxide 50 cc | Potassium Permanganate 50 cc |
| Quality of styrene | highly colored | Colored | Colored |

| Comparative Example | 9 | 10 |
|---|---|---|
| Treating Agent | Active clay 30 g | Maleic anhydride 25 g |
| Quality of styrene | Colored | Colored |

We claim:

1. The process for separating styrene from thermally cracked petroleum comprising the steps of:
   a. extractively distilling the fraction of said thermally cracked petroleum having a boiling point between 120°C. and 160°C. with a polar organic solvent in the presence of an effective amount of nitrite polymerization inhibitor sufficient to prevent substantial polymerization of styrene whereby a solvent solution of styrene is obtained,
   b. recovering styrene from said solvent solution,
   c. contacting said styrene with an effective amount of nitric acid sufficient to react with impurities in said styrene, and thereafter
   d. re-distilling said styrene to obtain a substantially pure and colorless styrene.

2. The process according to claim 1 wherein said fraction has a boiling point 135°C and 150°C.

3. The process according to claim 1 wherein said fraction is hydrogenated in the presence of palladium catalyst having sufficient catalytic activity to promote the hydrogenation of acetylenic impurities in said fraction, but insufficient catalytic activity to cause substantial hydrogenation of the styrene in said fraction.

4. The process according to claim 1 wherein said polar organic solvent is used in an amount from 0.5–5 times by weight of said fraction.

5. The process according to claim 1 wherein said polar organic solvent is selected from the group consisting of dimethylacetamide, β-methoxypropionitrile, butyllactone, N-methylprrolidone, dimethylformamide and dimethylsulfoxide.

6. The process according to claim 1 wherein said nitrite is an alkali metal nitrite and is added in said solvent in an amount of at least 50 ppm.

7. The process according to claim 1 wherein said nitrite is sodium nitrite or potassium nitrite and is added in said solvent in an amount from about 50 – 5000 ppm.

8. The process according to claim 1 wherein said styrene is reacted with at least 1 percent of nitric acid based on styrene fraction weight.

9. The process according to claim 1 wherein said styrene is reacted with 1 – 30 percent of nitric acid based on styrene fraction weight.

10. The process according to claim 1 wherein said styrene is scrubbed with water and/or an aqueous alkaline solution prior to re-distillation thereof.

* * * * *